(12) United States Patent
Oaki

(10) Patent No.: US 11,179,851 B2
(45) Date of Patent: Nov. 23, 2021

(54) ROBOT CONTROL DEVICE, ROBOT CONTROL PARAMETER ADJUSTMENT METHOD, AND NON-TRANSITORY STORAGE MEDIUM STORING PROGRAM

(71) Applicant: Kabushiki Kaisha Toshiba, Minato-ku (JP)

(72) Inventor: Junji Oaki, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 245 days.

(21) Appl. No.: 16/287,197

(22) Filed: Feb. 27, 2019

(65) Prior Publication Data

US 2020/0070346 A1    Mar. 5, 2020

(30) Foreign Application Priority Data

Aug. 28, 2018    (JP) .............................. JP2018-159740

(51) Int. Cl.
*B25J 9/16*    (2006.01)

(52) U.S. Cl.
CPC .......... *B25J 9/1671* (2013.01); *B25J 9/1664* (2013.01); *B25J 9/1692* (2013.01)

(58) Field of Classification Search
None
See application file for complete search history.

(56) References Cited

U.S. PATENT DOCUMENTS

| 4,860,215 A | * | 8/1989 | Seraji | ........................ | B25J 9/163 |
| | | | | | 700/260 |
| 6,218,801 B1 | * | 4/2001 | Brogårdh | ............... | B25J 9/1674 |
| | | | | | 318/565 |

(Continued)

FOREIGN PATENT DOCUMENTS

| JP | 06-320451 A | 11/1994 |
| JP | 2013-41478 A | 2/2013 |

(Continued)

OTHER PUBLICATIONS

Walter Verdonck, Jan Swevers, "Improving the Dynamic Accuracy of Industrial Robots by Trajectory Pre-Compensation.", May 2002, International Conference on Robotics and Automation (Year: 2002).*

Chae H. An, Christopher G. Atkeson, John M. Hollerbach, "Experimental Determination of the Effect of Feedforward Control on Trajectory Tracking Errors", 1986, IEEE International Conference on Robotsand Automation (Year: 1986).*

(Continued)

*Primary Examiner* — Khoi H Tran
*Assistant Examiner* — Tristan J Greiner
(74) *Attorney, Agent, or Firm* — Oblon, McClelland, Maier & Neustadt, L.L.P.

(57) ABSTRACT

A robot control device includes a log acquisitor, a first adjuster, and a second adjuster. The log acquisitor is configured to acquire operation data of a robot arm which has been operated by making a target portion of the robot arm follow a predefined target path under a feedback control. The first adjuster is configured to adjust, based on the operation data acquired by the log acquisitor, a first physical parameter for calculating a trajectory of the target portion, to reduce errors between the predefined target path and positions of the target portion. The second adjuster is configured to calculate, based on the first physical parameter adjusted by the first adjuster, the trajectory of the target portion, the second adjuster that is configured to adjust, based on the trajectory calculated by the second adjuster, a second physical parameter to be used for a feed-forward control for controlling the robot arm.

10 Claims, 14 Drawing Sheets

(56) References Cited

U.S. PATENT DOCUMENTS

| | | | |
|---|---|---|---|
| 9,008,840 B1* | 4/2015 | Ponulak | G06N 3/049 |
| | | | 700/250 |
| 2004/0093119 A1* | 5/2004 | Gunnarsson | B25J 9/1638 |
| | | | 700/245 |
| 2012/0296471 A1 | 11/2012 | Inaba et al. | |
| 2014/0222207 A1* | 8/2014 | Bowling | B25J 9/1633 |
| | | | 700/261 |
| 2015/0039128 A1* | 2/2015 | Oaki | B25J 9/1641 |
| | | | 700/253 |
| 2017/0066131 A1* | 3/2017 | Kamikawa | B25J 9/1697 |
| 2017/0108848 A1* | 4/2017 | Moberg | B25J 9/1641 |

FOREIGN PATENT DOCUMENTS

| | | |
|---|---|---|
| JP | 5383756 B2 | 1/2014 |
| JP | 2015-30076 A | 2/2015 |

OTHER PUBLICATIONS

Minoru Asada, "From Motor Learning to Behavior Learning and Cognitive Development", Journal of the Robotics Society of Japan, Japan, The Robotics Society of Japan, Mar. 15, 2004, vol. 22, No. 2, pp. 150-155 (with machine translation).

\* cited by examiner

FIG. 14

(a) 15 PHYSICAL PARAMETERS OBTAINED THROUGH FIRST OPTIMIZATION OF EACH OPERATION

|  | INITIAL IDENTIFIED VALUE | LINEAR X-AXIS | LINEAR Y-AXIS | CIRCLE 100 mm | CIRCLE 10 mm |
|---|---|---|---|---|---|
| $\alpha$ [kgm$^2$] | 2.43 | 2.84 | 1.81 | 3.00 | 2.01 |
| $\beta$ [kgm$^2$] | 1.81 | 2.18 | 1.87 | 1.87 | 1.70 |
| $\gamma$ [kgm$^2$] | 1.30 | 1.44 | 1.69 | 1.62 | 2.98 |
| $m_{M1}$ [kgm$^2$] | 7.71×10$^{-4}$ | 9.06×10$^{-4}$ | 8.17×10$^{-4}$ | 2.98×10$^{-4}$ | 2.17×10$^{-4}$ |
| $m_{M2}$ [kgm$^2$] | 2.54×10$^{-4}$ | 2.64×10$^{-4}$ | 3.12×10$^{-4}$ | 1.75×10$^{-4}$ | 2.59×10$^{-4}$ |
| $k_{G1}$ [Nm/rad] | 6.46×10$^4$ | 1.43×10$^5$ | 5.60×10$^4$ | 7.93×10$^4$ | 5.46×10$^4$ |
| $k_{G2}$ [Nm/rad] | 4.20×10$^4$ | 1.00×10$^4$ | 4.20×10$^5$ | 4.84×10$^4$ | 6.75×10$^4$ |
| $d_{L1}$ [Nms/rad] | 1.87×10$^1$ | 2.88×10$^{-7}$ | 7.38 | 1.32×10$^{-6}$ | 3.04 |
| $d_{L2}$ [Nms/rad] | 1.59×10$^1$ | 5.74 | 1.07×10$^{-4}$ | 3.08 | 2.69×10$^{-8}$ |
| $d_{M1}$ [Nms/rad] | 2.34×10$^{-14}$ | 4.75×10$^{-3}$ | 2.26×10$^{-14}$ | 2.78×10$^{-3}$ | 9.43×10$^{-3}$ |
| $d_{M2}$ [Nms/rad] | 2.36×10$^{-14}$ | 1.42×10$^{-4}$ | 1.28×10$^{-3}$ | 9.97×10$^{-4}$ | 6.42×10$^{-3}$ |
| $d_{G1}$ [Nms/rad] | 1.29×10$^2$ | 2.69×10$^1$ | 1.74×10$^{-3}$ | 7.65×10$^{-4}$ | 8.39×10$^1$ |
| $d_{G2}$ [Nms/rad] | 3.25×10$^{-5}$ | 3.78×10$^{-11}$ | 1.51 | 5.68×10$^{-2}$ | 1.45×10$^{-6}$ |
| $f_{M1}$ [Nm] | 2.33×10$^{-1}$ | 2.22×10$^{-1}$ | 3.64×10$^{-1}$ | 4.92×10$^{-1}$ | 3.14×10$^{-1}$ |
| $f_{M2}$ [Nm] | 5.68×10$^{-2}$ | 5.09×10$^{-2}$ | 1.68×10$^{-2}$ | 1.50×10$^{-1}$ | 1.37×10$^{-1}$ |

(b) EIGHT PHYSICAL PARAMETERS FOR FEED-FORWARD OBTAINED THROUGH SECOND OPTIMIZATION OF EACH OPERATION

|  | INITIAL IDENTIFIED VALUE | LINEAR X-AXIS | LINEAR Y-AXIS | CIRCLE 100 mm | CIRCLE 10 mm |
|---|---|---|---|---|---|
| $m_1$ [kgm$^2$] | 1.74×10$^{-3}$ | 1.62×10$^{-3}$ | 4.32×10$^{-3}$ | 1.73×10$^{-3}$ | 1.66×10$^{-3}$ |
| $m_2$ [kgm$^2$] | 2.54×10$^{-4}$ | 3.84×10$^{-5}$ | 9.03×10$^{-4}$ | 2.94×10$^{-5}$ | 2.65×10$^{-5}$ |
| $m_3$ [kgm$^2$] | 1.81 | 3.48 | 2.31 | 2.57 | 3.75 |
| $m_4$ [kgm$^2$] | 1.30 | 2.01 | 1.77 | 1.07 | 2.56 |
| $d_1$ [Nms/rad] | 7.49×10$^{-3}$ | 3.75×10$^{-3}$ | 2.27×10$^{-14}$ | 2.80×10$^{-3}$ | 9.62×10$^{-3}$ |
| $d_2$ [Nms/rad] | 6.39×10$^{-3}$ | 1.39×10$^{-3}$ | 1.65×10$^{-4}$ | 4.15×10$^{-3}$ | 4.09×10$^{-3}$ |
| $f_{M1}$ [Nm] | 2.33×10$^{-1}$ | 4.42×10$^{-1}$ | 5.00×10$^{-1}$ | 5.00×10$^{-1}$ | 1.03×10$^{-11}$ |
| $f_{M2}$ [Nm] | 5.68×10$^{-2}$ | 1.11×10$^{-1}$ | 2.47×10$^{-1}$ | 1.91×10$^{-1}$ | 5.00×10$^{-1}$ |

# ROBOT CONTROL DEVICE, ROBOT CONTROL PARAMETER ADJUSTMENT METHOD, AND NON-TRANSITORY STORAGE MEDIUM STORING PROGRAM

CROSS-REFERENCE TO RELATED APPLICATION

This application is based upon and claims the benefit of priority from Japanese Patent Application No. 2018-159740, filed Aug. 28, 2018; the entire contents of which are incorporated herein by reference.

BACKGROUND

Field

Embodiments described herein relate generally to a robot control device, a robot control parameter adjustment method, and a non-transitory storage medium storing a program.

Background

In trajectory following control, used in fields of such as manufacturing, for making a tip of a robot arm follow a desired path, model-based control based on identification of an accurate dynamic model is required in order to obtain high-accuracy following performance. However, generally, it is difficult to identify an accurate dynamic model.

On the other hand, in trajectory following control of a tip of a robot arm, an approach of controlling a robot arm using repetitive learning control which does not require an accurate dynamic model is also conceivable. For example, a technique for acquiring appropriate control parameters while repeatedly operating a robot in order to generate an input of feed-forward control added to obtain high-accuracy following performance is known. However, repeatedly operating a robot arm while selecting safe parameters so as not to cause a danger to the robot arm requires time and effort and results in wear of a mechanism of the robot arm. For this reason, in trajectory following control of a tip of a robot arm, control for performing off-line repetitive learning using a computer simulation has been desired.

In recent years, the ability of computers has improved, and thus it is possible to construct a simulator based on a dynamic model of a robot arm and to perform trajectory following control of a tip of a robot arm having been subjected to off-line repetitive learning. For example, acquiring a manipulation skill for a trajectory with respect to a tip of a robot arm has been performed using end-to-end deep learning.

This is reward-based reinforcement learning and is a trajectory following control which is constructed in a framework of unsupervised learning. An off-line simulator used in a framework of supervised learning such as the above-described trajectory following control which is given a path in advance is required to be accurate. For this reason, it is necessary to identify an accurate dynamic model in trajectory following control of a tip of a robot arm.

A robot control device according to an embodiment includes a log acquisitor, a first adjuster, and a second adjuster. The log acquisitor is configured to acquire operation data in a case that a target portion of a robot arm is made to follow a predetermined path under portion control. The first adjuster is configured to adjust a first physical parameter for calculating operation of the robot arm so as to reduce a following error between the path and a position of the target portion on the basis of the operation data acquired by the log acquisitor. The second adjuster is configured to calculate a trajectory obtained by making the robot arm follow the path on the basis of the first physical parameter adjusted by the first adjuster and adjusts a second physical parameter used for feed-forward control of the robot arm on the basis of calculation results.

BRIEF DESCRIPTION OF THE DRAWINGS

FIG. 14 is a diagram showing an example of physical parameters obtained from initial identified values through first optimization and second optimization in operations shown in FIGS. 3($a$), 3($b$), 3($c$), and 3($d$) according to a third embodiment.

DETAILED DESCRIPTION

Figure 1:
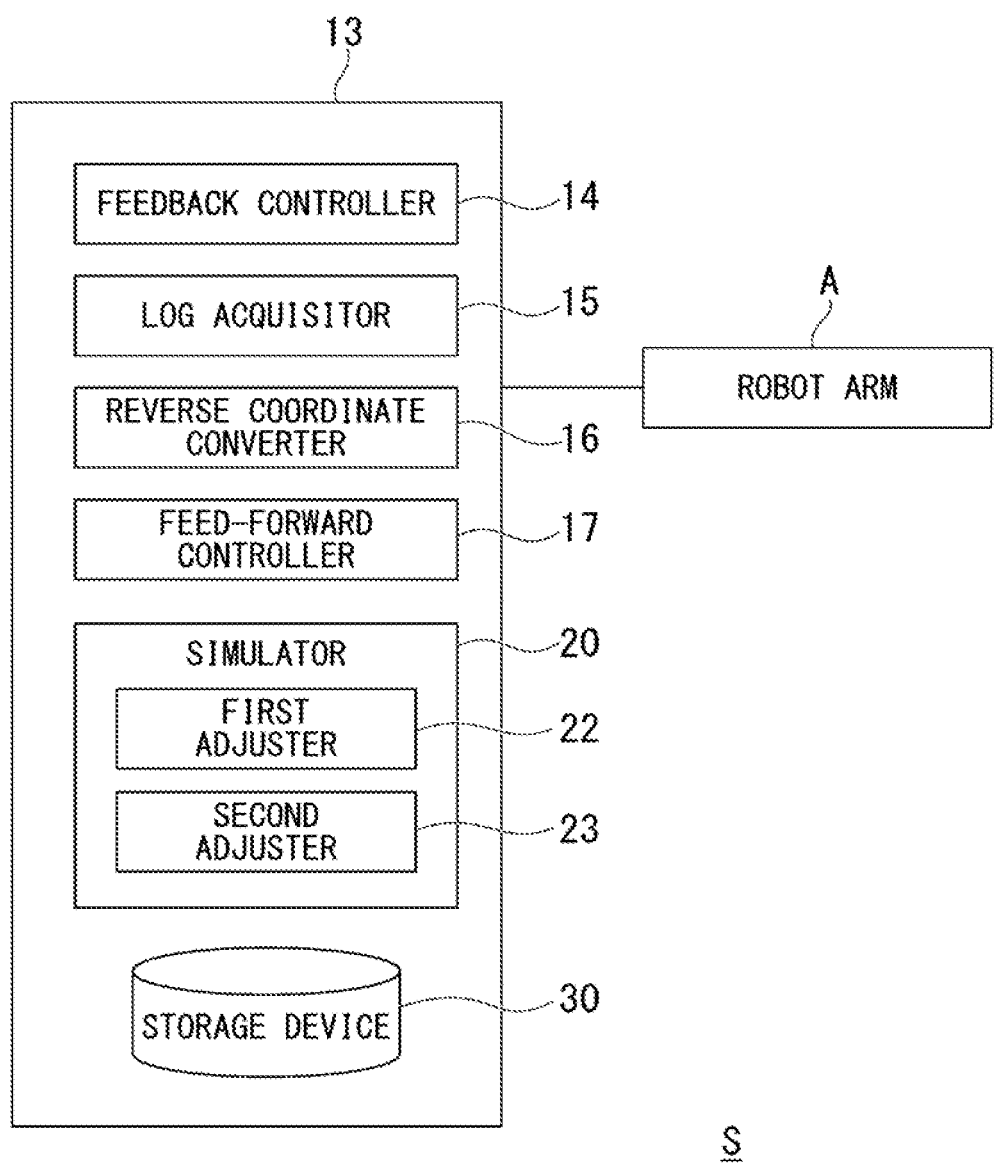
FIG. 1 is a block diagram showing an example of a configuration of a robot control device according to a first embodiment.

Various Embodiments will be described hereinafter with reference to the accompanying drawings.

In some embodiments, a robot control device may include, but is not limited to, a log acquisitor, a first adjuster, and a second adjuster. The log acquisitor is configured to acquire operation data of a robot arm which has been operated by making a target portion of the robot arm follow a predefined target path under a feedback control. The first adjuster is configured to adjust, based on the operation data acquired by the log acquisitor, a first physical parameter for calculating a trajectory of the target portion, to reduce errors between the predefined target path and positions of the target portion. The second adjuster that is configured to calculate, based on the first physical parameter adjusted by the first adjuster, the trajectory of the target portion. The second adjuster that is configured to adjust, based on the trajectory calculated by the second adjuster, a second physical parameter to be used for a feed-forward control for controlling the robot arm.

In some embodiments, the first adjuster is configured to optimize the first physical parameter included in a dynamic model for calculating an operation of the robot arm so as to minimize the error between the predefined target path and the positions of the target portion on the basis of the operation data acquired by the log acquisitor.

In some embodiments, the second adjuster is configured to calculate the trajectory of the target portion on the basis of the first physical parameter adjusted by the first adjuster and to optimize the second physical parameter to be used for the feed-forward control of the robot arm on the basis of the calculation results and a reverse dynamic model.

In some embodiments, the first adjuster is configured to optimize the first physical parameter included in a dynamic model for calculating operation of the robot arm for each segment of the predefined target path represented by basic figure patterns. The second adjuster is configured to optimize the second physical parameter used for the feed-forward control for each path segment.

In some embodiments, the robot control device may further include, but is not limited to, a feed-forward controller that is configured to execute a feed-forward control by switching the second physical parameter used for the feed-forward control for each segment of the predefined target path.

In some embodiments, a robot control device may include, but is not limited to, a log acquisitor, a first adjuster, a second adjuster, and a feed-forward controller. The log acquisitor is configured to acquire operation data of a robot arm which has been operated by making a target portion of the robot arm follow a predefined target path under a feedback control. The first adjuster is configured to adjust, based on the operation data acquired by the log acquisitor, a first physical parameter for calculating a trajectory of the target portion, to reduce errors between the predefined target path and positions of the target portion. The second adjuster is configured to calculate, based on the first physical parameter adjusted by the first adjuster, the trajectory of the target portion, the second adjuster that is configured to adjust, based on the trajectory calculated by the second adjuster, a second physical parameter to be used for a feed-forward control for controlling the robot arm. The feed-forward controller is configured to execute a feed-forward control by switching the second physical parameter used for the feed-forward control for each segment of the predefined target path represented by basic figure patterns.

In some embodiments, a robot device may include, but is not limited to, a robot arm, a log acquisitor, a first adjuster, and a second adjuster. The robot arm includes a plurality of arms having a plurality of movable axes. The log acquisitor is configured to acquire operation data of a robot arm which has been operated by making a target portion of the robot arm follow a predefined target path under a feedback control. The first adjuster is configured to adjust, based on the operation data acquired by the log acquisitor a first physical parameter for calculating a trajectory of the target portion, to reduce errors between the predefined target path and positions of the target portion. The second adjuster is configured to calculate, based on the first physical parameter adjusted by the first adjuster, the trajectory of the target portion, the second adjuster that is configured to adjust, based on the trajectory calculated by the second adjuster, a second physical parameter to be used for a feed-forward control for controlling the robot arm.

In some embodiments, a computer-implemented method for a robot control parameter adjustment may include, but is not limited to, acquiring operation data of a robot arm which has been operated by making a target portion of the robot arm follow a predefined target path under a feedback control; adjusting, based on the operation data acquired, a first physical parameter for calculating a trajectory of the target portion, to reduce errors between the predefined target path and positions of the target portion; calculating, based on the first physical parameter adjusted, the trajectory of the target portion; and adjusting, based on the trajectory calculated by the second adjuster, a second physical parameter to be used for a feed-forward control for controlling the robot arm.

In some embodiments, a computer-implemented method for a robot control parameter adjustment may include, but is not limited to, acquiring, from a storage, operation data of a robot arm which has been operated by making a target portion of the robot arm follow a predefined target path under a feedback control; storing a first calculation result in the storage, the first calculation result including a first physical parameter which has been adjusted, based on the operation data acquired, for calculating a trajectory of the target portion, to reduce errors between the predefined target path and positions of the target portion; storing a second calculation result in the storage, the second calculation result including the trajectory of the target portion which has been calculated, based on the first physical parameter adjusted; and storing a third calculation result in the storage, the third calculation result including a second physical parameter which has been adjusted, based on the trajectory calculated, for a feed-forward control for controlling the robot arm.

In some embodiments, a non-transitory computer readable storage medium that stores a computer executable program, when executed by a computer, to cause the computer to perform a computer-implemented method for a robot control parameter adjustment. The method may include, but is not limited to, acquiring operation data of a robot arm which has been operated by making a target portion of the robot arm follow a predefined target path under a feedback control; adjusting, based on the operation data acquired, a first physical parameter for calculating a trajectory of the target portion, to reduce errors between the predefined target path and positions of the target portion; calculating, based on the first physical parameter adjusted, the trajectory of the target portion; and adjusting, based on the trajectory calculated by the second adjuster, a second physical parameter to be used for a feed-forward control for controlling the robot arm.

Hereinafter, a robot control device, a robot control parameter adjustment method, and a non-transitory storage medium storing a program according to an embodiment will be described with reference to the accompanying drawings.

First Embodiment

FIG. 1 is a block diagram showing an example of a configuration of a robot control device S according to a first embodiment. The robot control device S includes a 2-link (2-axis) robot arm A and a control device 13. The robot arm A is controlled by the control device 13.

The control device 13 includes, for example, a feedback controller 14, a log acquisitor 15, a reverse coordinate converter 16, a feed-forward controller 17, a simulator 20, and a storage device 30.

Some or all of the functions of the feedback controller 14, the reverse coordinate converter 16, the feed-forward controller 17, and the simulator 20 are realized by executing a program (software) with a processor such as a central processing unit (CPU). In addition, some or all of these functions may be realized by hardware such as a large scale integration (LSI), an application specific integrated circuit (ASIC), a field-programmable gate array (FPGA), or a graphics processing unit (GPU), or may be realized by cooperation between software and hardware. The program may be stored in advance in the storage device 30 constituted by a hard disk drive (HDD), a flash memory, a read only memory (ROM), a random access memory (RAM), or the like, may be stored in a detachable storage medium such as a DVD or a CD-ROM, or may be installed in the storage device 30 by mounting a storage medium on a drive device.

The feedback controller 14 is, for example, a PID controller performing proportion, integration, and differentiation (PID) control for feeding back an encoder signal for detecting a motor rotation angle. The feedback controller 14 performs PID control on the basis of an output value of an encoder that detects an angle of a motor M. The feedback controller 14 performs control for making the robot arm A follow a target trajectory by controlling the motor M so as to set target values of a rotation angle of the motor M of each axis in order to realize a given path.

The log acquisitor 15 acquires operation data in a case that the robot arm A follows a path. For example, the log acquisitor 15 monitors a motor current command value and an encoder value in time series to acquire operation data. The log acquisitor 15 may read out the operation data stored in the storage device 30.

The reverse coordinate converter 16 arithmetically calculates the target trajectory of the robot arm A. Since the target trajectory of the 2-link robot arm A is a trajectory in a two-dimensional plane, the reverse coordinate converter 16 arithmetically calculates the target trajectory as a trajectory of a rotation angle of each axis through arithmetic calculation of known reverse coordinate conversion on the basis of a linear or circular trajectory in a rectangular coordinate system (see FIG. 3).

However, since the target trajectory is designated on a time axis, not only a rotation angle but also a rotational angular velocity and a rotation angle acceleration trajectory are implicitly designated. However, in the arithmetic calculation of the feedback controller 14, only a rotation angle target trajectory is used.

The feed-forward controller 17 performs feed-forward control of motors of the robot arm A using optimized physical parameters which are applied to a reverse dynamic model for feed-forward control. Processing of the feed-forward controller 17 will be described later.

The simulator 20 operates a dynamic model and a reverse dynamic model for calculating the operation of the robot arm A to optimize physical parameters included in the dynamic model and the reverse dynamic model. Processing of the simulator 20 will be described later.

The storage device 30 stores, for example, physical parameters included in a dynamic model used for feedback control. In addition, the storage device 30 stores, for example, physical parameters included in a reverse dynamic model used for feed-forward control. The storage device 30 includes a storage device such as a HDD, a flash memory, an electrically erasable programmable read only memory (EEPROM), a ROM, or a RAM.

Figure 2:
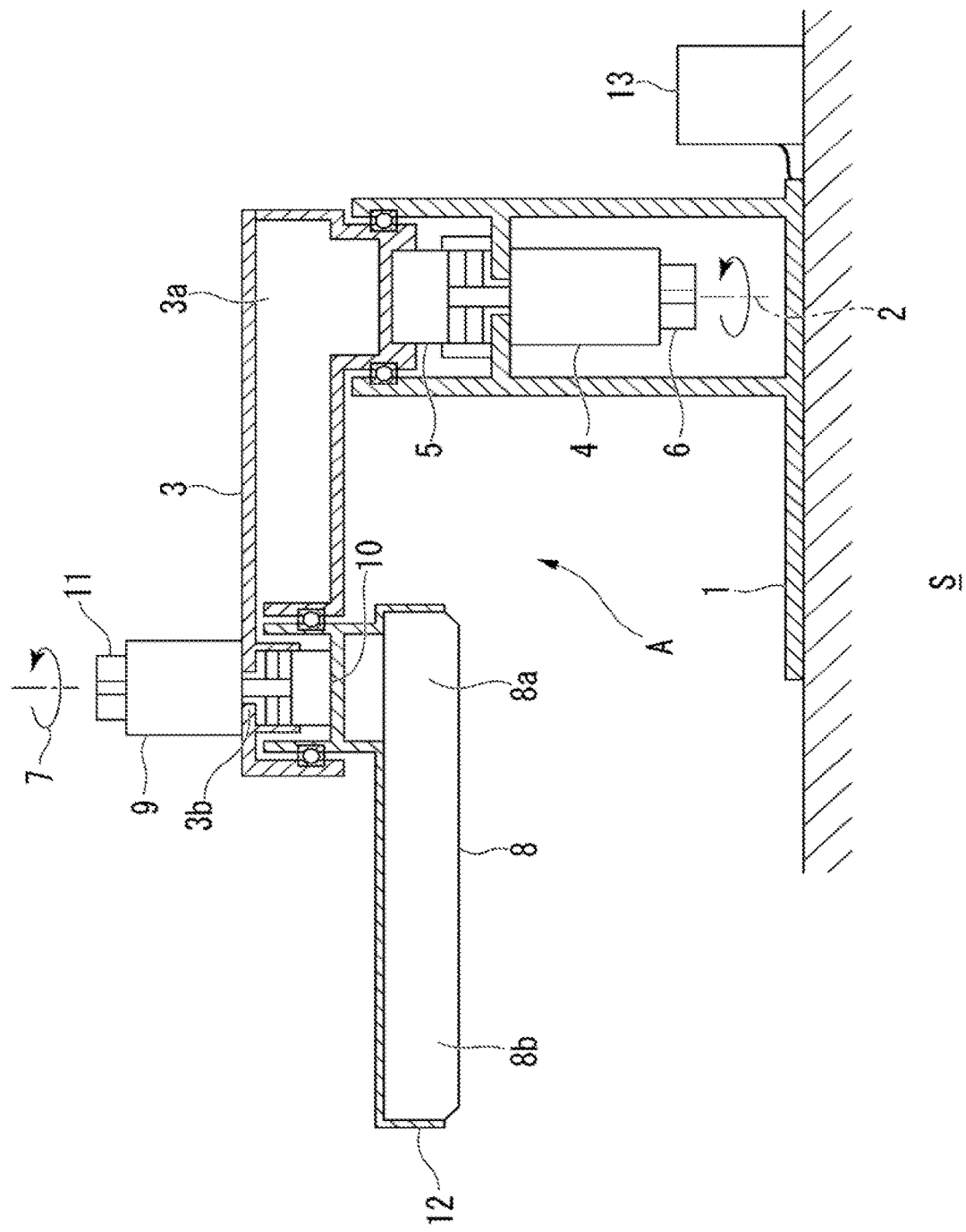
FIG. 2 is a diagram showing an example of a configuration of the robot control device according to the first embodiment.

FIG. 2 is a diagram showing an example of a configuration of the robot control device S according to the first embodiment. The robot arm includes a first link and a second link. A first link 3 is an arm which is rotatably supported by a base 1 of which a base end 3a is fixed to a floor or the like. For example, the first link 3 is rotated around a first axis 2 along the vertical direction with respect to the base 1 at a speed reduced by a first speed reducer 5 using a first motor 4 serving as a driving source. A rotation angle with respect to the base 1 of the first link 3 is detected by a first encoder 6.

A second link 8 is an arm in which a base end 8a is rotatably supported by the first link 3 at a tip 3b of the first link 3. For example, the second link 8 is rotated around a second axis 7 along the vertical direction with respect to the first link 3 at a speed reduced by a second speed reducer 10 using a second motor 9 serving as a driving source. A rotation angle with respect to the first link 3 of the second link 8 is detected by a second encoder 11. With such a configuration, the robot arm A is controlled by the control device 13 so that a tip 8b of the second link 8 is moved along any trajectory within a range of a horizontal plane in which movement is possible.

Figure 3:
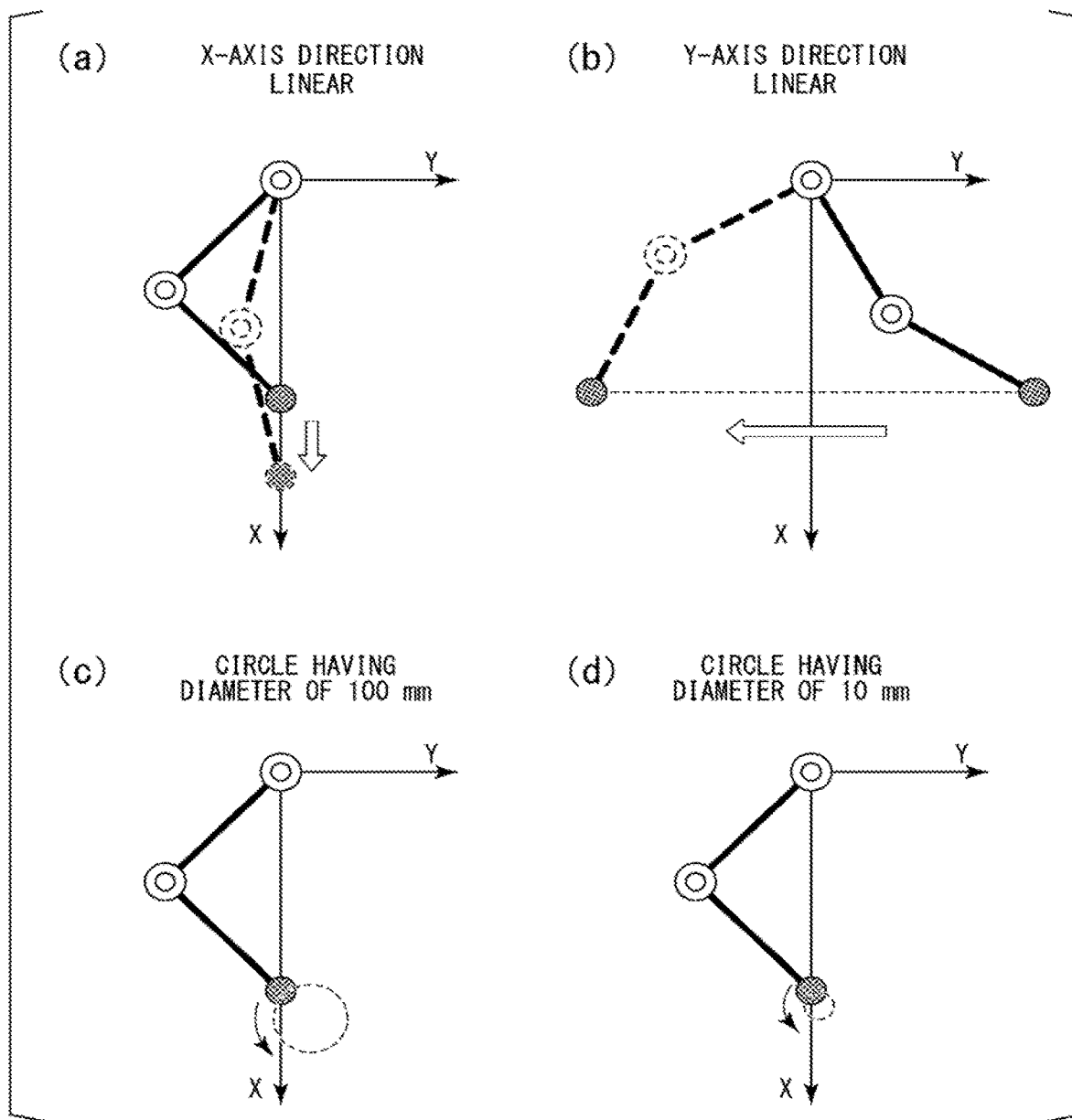
FIG. 3 is a diagram showing an example of trajectories of a tip of a robot arm in a horizontal plane.

FIG. 3 is a diagram showing an example of a trajectory of the tip 8b of the robot arm A in a horizontal plane. A target portion of the robot arm A made to follow a path is the tip of the robot arm A, but may be another area. For example, a trajectory of the tip of the robot arm A may be given a path constituted by any figure in a predetermined two-dimensional plane. The path constituted by any figure is divided into path segments whose any figure is represented by basic figure patterns such as a straight line or an arc, and the robot arm A is controlled on the basis of control values calculated for each path segment.

Figure 4:
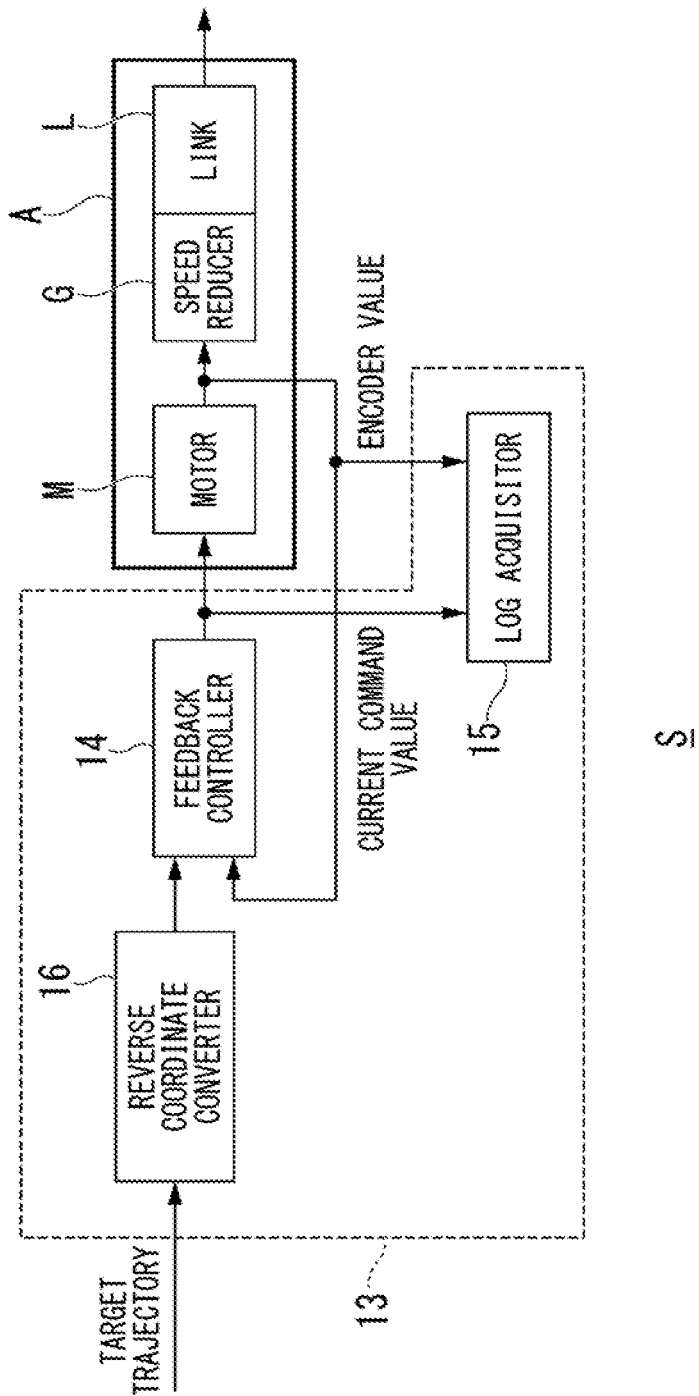
FIG. 4 is a block diagram showing an example of a configuration of a robot control device controlling the robot arm on the basis of feedback.

FIG. 4 is a block diagram showing an example of a configuration of a robot control device controlling the robot arm A on the basis of feedback. The robot arm A is constituted by the motor M driving each axis, a speed reducer G, and a link L. The motor M includes, for example, the first motor 4 and the second motor 9 as described above. The speed reducer G includes, for example, the first speed reducer 5 and the second speed reducer 10 as described above. The link L includes, for example, the first link and the second link as described above.

Figure 5:
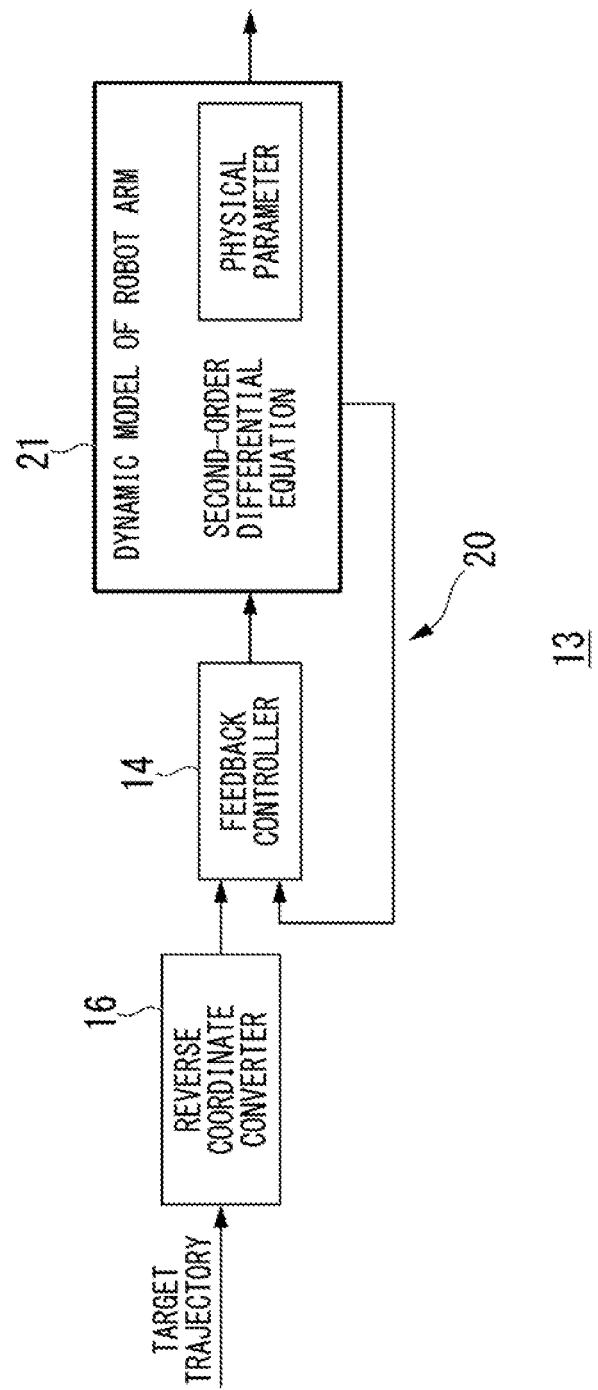
FIG. 5 is a block diagram showing an example of a simulator performing processing using a dynamic model of the robot arm based on feedback.

FIG. 5 is a block diagram showing an example of the simulator 20 performing processing using a dynamic model of the robot arm A based on feedback. The simulator 20 is realized on a computer such as a personal computer. For example, the simulator 20 may be executed in the control device 13. In the simulator 20, the following dynamic model 21 is executed instead of operating the real machine of the robot arm A. The dynamic model 21 is a model for calculating the operation of the robot arm A. The dynamic model 21 is obtained by replacing the real machine of the robot arm A with a virtual model on a computer in the simulator 20.

In the dynamic model, for example, the robot arm A is described using a second-order differential equation as a multi-link mechanism having elastic joints (a speed reducer of each axis serves as a spring element). The dynamic model of a 2-link robot arm is nonlinear, and the following two sets of expressions on the motor side and the link side are given.

Motor side $$M_M \ddot{\theta}_M + D_M \dot{\theta}_M + f_M \mathrm{sgn}(\dot{\theta}_M) = \\ Eu - N_G [K_G(N_G \theta_M - \theta_L) + D_G(N_G \dot{\theta}_M - \dot{\theta}_L)] \quad (1)$$

Link side $$M_L(\theta_L) \ddot{\theta}_L + c_L(\dot{\theta}_L, \theta_L) + D_L \dot{\theta}_L = K_G(N_G \theta_M - \theta_L) + D_G(N_G \dot{\theta}_M - \dot{\theta}_L)$$

Here, the following expressions are given.
$\theta_M = [\theta_{M1}, \theta_{M2}]^T$: Motor rotation angle (1 and 2 are shaft numbers)
$\theta_L = [\theta_{L1}, \theta_{L2}]^T$: Link rotation angle
$M_L(\theta_L) \in R^{2 \times 2}$: Link inertia matrix
$c_L(\dot{\theta}_L, \theta_L) \in R^{2 \times 1}$: Centrifugal torque and Coriolis torque vector
$M_M = \mathrm{diag}(m_{M1}, m_{M2})$: Motor+speed reducer high-speed stage inertia
$D_M = \mathrm{diag}(d_{M1}, d_{M2})$: Motor shaft viscous friction coefficient
$D_L = \mathrm{diag}(d_{L1}, d_{L2})$: Link shaft viscous friction coefficient
$K_G = \mathrm{diag}(k_{G1}, k_{G2})$: Speed reducer spring constant
$D_G = \mathrm{diag}(d_{G1}, d_{G2})$: Speed reducer attenuation coefficient
$N_G = \mathrm{diag}(n_{G1}, n_{G2})$: Speed reduction ratio ($nG_1$, $nG_2 \le 1$)
$f_M = [f_{M1}, f_{M2}]^T$: Motor shaft coulomb friction torque
$E = \mathrm{diag}(e_1, e_2)$: Torque/voltage (current command value) constant
$u = [u_1, u_2]^T$: Input voltage (command value with respect to motor current control system)

Here, in a case that $\alpha$, $\beta$, and $\gamma$ are assumed to be parameters constituted by the length of the link, the position of the center of gravity, a mass, and an inertia, a link inertia matrix is expressed as the following expression.

$$M_L(\theta_L) = \begin{bmatrix} \alpha + \beta + 2\gamma \cos(\theta_{L2}) & \beta + \gamma \cos(\theta_{L2}) \\ \beta + \gamma \cos(\theta_{L2}) & \beta \end{bmatrix} \quad (2)$$

Details of the parameters $\alpha$, $\beta$, and $\gamma$ are expressed as the following expression.

$$\alpha = m_1 l_{g1}^2 + I_{z1} + m_2 l_1^2$$

$$\beta = m_2 l_{g2}^2 + I_{z2}$$

$$\gamma = m_2 l_1 l_{g2} \quad (3)$$

Here, the following expressions are given.
$l_i$: Length of each link (i is a shaft number)
$m_i$: Mass of each link
$l_{gi}$: Position of center of gravity of each link (links are bilaterally symmetrical to each other in longitudinal direction)
$I_{zi}$: Inertia moment around center of gravity of each link
Regarding the centrifugal torque and Coriolis torque vector, the following expression is given.

$$c_L(\dot{\theta}_L, \theta_L) = \begin{bmatrix} -\gamma(2\dot{\theta}_{L1}\dot{\theta}_{L2} + \dot{\theta}_{L2}^2)\sin(\theta_{L2}) \\ \gamma \dot{\theta}_{L1}^2 \sin(\theta_{L2}) \end{bmatrix} \quad (4)$$

Physical parameters (15 physical parameters in the 2-link robot arm A) such as a moment of inertia, a coefficient of friction, and a spring coefficient of each portion, which are shown in Expressions (1) to (4), are required to be identified in advance. The initial identification errors of the physical parameters at this point can be reverted from by first optimization to be described later.

In the present embodiment, an elastic joint model, that is, a model having one spring coefficient in a speed reducer of each axis is used, but it is not intended to design a control system for damping vibration of the robot arm A caused by axis twisting (twisting of a motor rotation angle and a link rotation angle). For this reason, in the present embodiment, it is intended to reproduce an action close to the real machine using the simulator 20 to which the dynamic model 21 is applied by using a larger number of physical parameters than those of a rigid joint model.

In the present embodiment, in the feedback controller 14 using the PID controller, it is also possible to use a vibration damping control system performing, for example, feedback for axis twisting explicitly. The feedback controller 14 performs arithmetic calculation for performing feedback control on the basis of the following expression.

$$u_i = k_{Pi} e_{Ri} + k_{Ii} \int e_{Ri} dt - k_{Di} \dot{e}_{Ri}$$

$$e_{Ri} = \theta_{MRi} - \theta_{Mi} \quad (5)$$

Here, the following expressions are given.
$\theta_{MRi}$: Motor rotation angle target value (i=1 and 2 are shaft numbers)
$\theta_{Mi}$: Motor rotation angle
$k_{Pi}$: Proportion feedback control gain
$k_{Ii}$: Integration feedback control gain
$k_{Di}$: Differentiation feedback control gain
$e_{Ri}$: Control deviation of motor rotation angle
$u_i$: Input voltage (command value with respect to motor current control system)

In the simulator 20, the same control gain as that of the real machine of the robot arm A is set.

Figure 6:
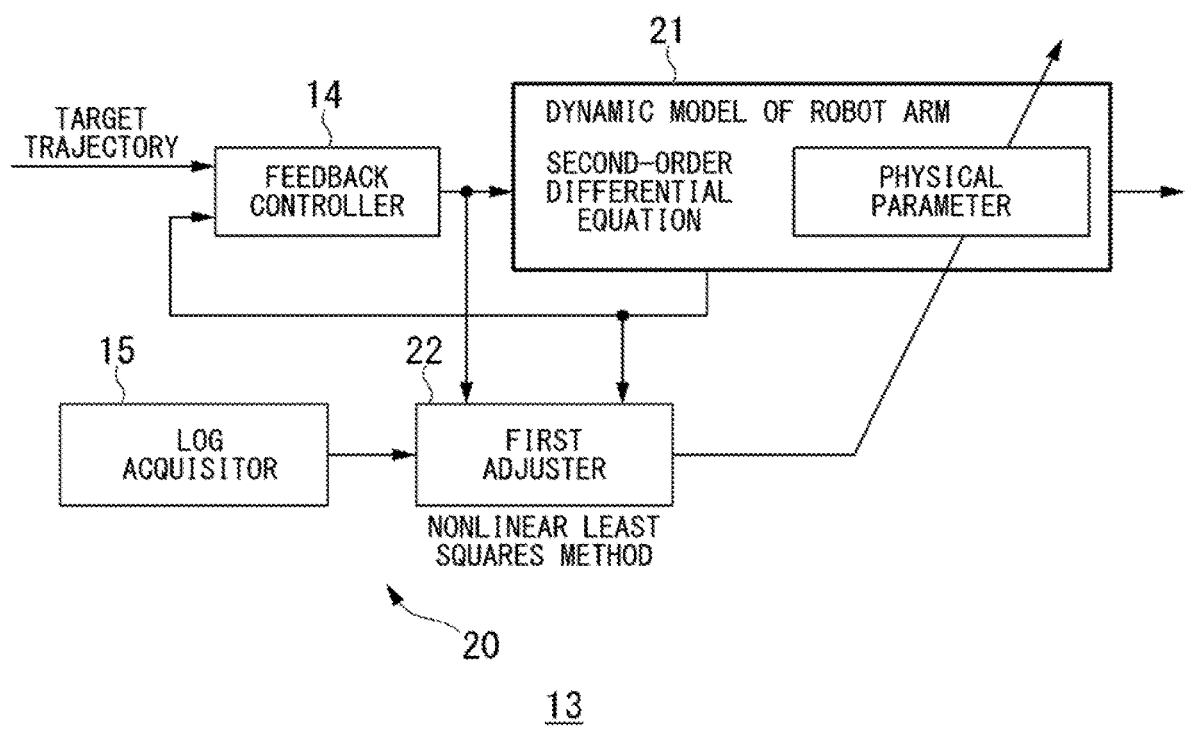
FIG. 6 is a block diagram showing an example of a control device 13 performing optimization (first optimization) processing of physical parameters of a dynamic model.

FIG. 6 is a block diagram showing an example of the control device 13 performing optimization (first optimization) processing of physical parameters of the dynamic model 21. A first adjuster 22 performs optimization of physical parameters (the above-described 15 physical parameters) in the dynamic model 21 in the simulator 20 so as to minimize following errors for a path with respect to the position of the tip of the robot arm A by using an evaluation function based on a square criterion using time-series operation data recorded in the log acquisitor 15.

Figure 7:
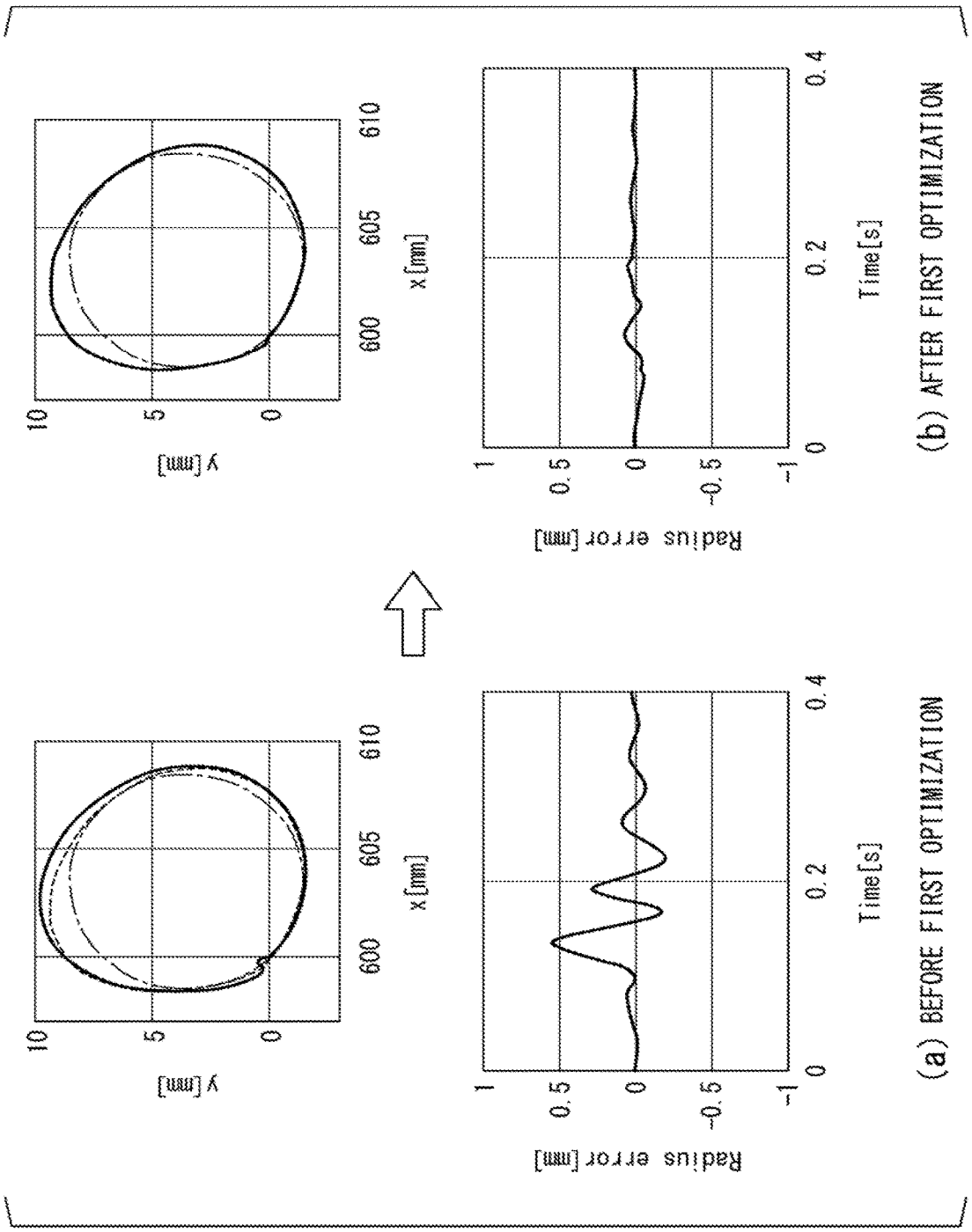
FIG. 7 is a diagram showing an example of operation trajectories before and after the first optimization in a circular trajectory shown in FIG. 3($d$).

Hereinafter, the first optimization will be described by taking a circular trajectory shown in FIG. 3(d) as an example. FIG. 7 is a diagram showing an example of operation trajectories before and after the first optimization in the circular trajectory shown in FIG. 3(d). In an upper graph of FIG. 7(a), a path of a circular trajectory which is target values is shown by an alternating dotted-dashed line.

An experiment of controlling the 2-link robot arm A, having a total length of 800 [mm], which is installed at a position of X=0 [mm] and Y=0 [mm] and drawing a circular trajectory having a diameter of 10 [mm] counterclockwise over approximately 0.4 seconds using the tip of the robot arm A with X=600 [mm] and Y=0 [mm] as a starting point was performed using the real machine and a simulator.

In the upper graph of FIG. 7(a), a trajectory drawn by the real machine of the robot arm A is shown by a dashed line. As is apparent from the drawing, the trajectories do not have a circular shape but an oval shape. This indicates that it is not possible to follow the circular trajectory which is set as described above through only feedback control using the PID controller in the control of the robot arm A.

In the upper graph of FIG. 7(a), the trajectories drawn by the simulator 20 (see FIG. 5) based on the dynamic model 21 are shown by a solid line. Similarly, in this case, oval trajectories are formed, but errors occur as compared with the trajectories of the real machine of the robot arm A. This means that the dynamic model 21 set by the simulator 20 does not completely express the real machine of the robot arm A. In the first place, the dynamic model 21 shown in Expressions (1) to (4) is an approximate model, and naturally, there are identification errors of physical parameters.

Consequently, in a case that the simulator 20 is caused to draw a circular trajectory, the simulator is caused to perform processing for optimizing physical parameters (15 physical parameters) of the dynamic model 21 so that the circular trajectory is consistent with the trajectory of the real machine of the robot arm A.

The first adjuster 22 performs optimization of physical parameters based on a nonlinear least squares method using operation data of the real machine of the robot arm A and operation data of the simulator 20 which are recorded by the log acquisitor 15. An evaluation function of the optimization is given by a square criterion as in the following expression.

$$E_1 = \int [r(\Delta\theta_{M1}^2 + \Delta\theta_{M2}^2) + \Delta u_1^2 + \Delta u_2^2] dt \quad (6)$$

Here, first and second terms on the right side represent the square of an error of a motor rotation angle of each axis set by the actual machine of the robot arm A and the simulator 20, and third and fourth terms on the right side represent the square of an error of a current command value. In the first and second terms on the right side, r is a weight introduced to adjust the order of a motor rotation angle and a current command value which differ in a unit system. An evaluation function of a square criterion given by Expression (6) can be minimized by a nonlinear least squares method (for example, a Levenberg-Marquardt method) which is a known numerical solution. The first adjuster 22 searches for 15 physical parameters using the evaluation function. That is, the first adjuster 22 can minimize an error of a rotation angle of the motor M of each axis by performing off-line repetitive learning control using the evaluation function.

Due to the first optimization executed in the first adjuster 22, the trajectory of the real machine of the robot arm A indicated by a dashed line and the trajectory of the simulator 20 indicated by a solid line are consistent with each other as shown in the upper drawing of FIG. 7(b). In other words, the circular trajectory shown in FIG. 3(d) can be reproduced by the off-line simulator 20 without operating the real machine.

A lower portion of FIG. 7(a) shows errors of the trajectory of the real machine of the robot arm and the trajectory of the simulator in a radial direction before the first optimization, and a lower portion of FIG. 7(b) shows errors after the first optimization. It can be understood that a peak value of the error in the latter case is approximately a tenth of that in the former case.

Since it is not possible to follow the circular trajectory as shown in FIG. 7 through only feedback control based on the PID controller, feed-forward control based on a reverse dynamic model is introduced. However, reversing Expression (1) of a dynamic model based on an elastic joint (representation in the form of current command value u=) requires a higher-order derivative, and thus mounting becomes complicated. Consequently, a dynamic model based on a rigid joint is derived to simplify feed-forward control. In Expression (1), in a case that $[\theta_L = N_G \theta_M]$ is established, the following expression is derived.

$$M(\theta_M)\ddot{\theta}_M + c(\dot{\theta}_M, \theta_M) + D\dot{\theta}_M + f_M sgn(\dot{\theta}_M) = Eu \quad (7)$$

Here, M, c, and D satisfy the following expression and respectively represent an inertia matrix as a rigid joint model, a centrifugal torque and Coriolis torque vector, and a viscous friction matrix which are expressed only by motor rotation angles.

$$M(\theta_M) = \begin{bmatrix} n_{G1}^2[\alpha + \beta + 2\gamma\cos(n_{G2}\theta_{M2})] + m_{M1} & n_{G1}n_{G2}[\beta + \gamma\cos(n_{G2}\theta_{M2})] \\ n_{G1}n_{G2}[\beta + \gamma\cos(n_{G2}\theta_{M2})] & n_{G2}^2\beta + m_{M2} \end{bmatrix} \quad (8)$$

$$\equiv \begin{bmatrix} m_1 + n_{G1}^2[2m_4\cos(n_{G2}\theta_{M2})] & n_{G1}n_{G2}[m_3 + m_4\cos(n_{G2}\theta_{M2})] \\ n_{G1}n_{G2}[m_3 + m_4\cos(n_{G2}\theta_{M2})] & n_{G2}^2 m_3 + m_2 \end{bmatrix}$$

$$c(\dot{\theta}_M, \theta_M) = \begin{bmatrix} -n_{G1}m_4(2n_{G1}\dot{\theta}_{M1}n_{G2}\dot{\theta}_{M2} + n_{G2}^2\dot{\theta}_{M2}^2)\sin(n_{G2}\theta_{M2}) \\ n_{G2}m_4 n_{G2}^2\dot{\theta}_{M1}^2\sin(n_{G2}\theta_{M2}) \end{bmatrix}$$

$$D = \text{diag}(n_{G1}^2 d_{L1} + d_{M1}, n_{G2}^2 d_{L2} + d_{M2})$$

$$\equiv \text{diag}(d_1, d_2)$$

Four parameters in M and c are expressed by m1, m2, m3, and m4, and two parameters in D are expressed by d1 and d2. Accordingly, the number of physical parameters of a simplified dynamic model is eight together with two coulomb friction torques $f_{M1}$ and $f_{M2}$ and is approximately half of 15 physical parameters of Expression (1) which is the dynamic model before simplification. In the operation of the present embodiment, vibration of the robot arm due to simplification does not cause a problem.

By using Expression (7), feed-forward control based on a reverse dynamic model simplified by a rigid joint is given by the following expression using a target value θMR at a motor rotation angle.

$$\tau_{FF} = E^{-1}[M(\theta_{MR})\ddot{\theta}_{MR} + c(\dot{\theta}_{MR}, \theta_{MR}) + D\dot{\theta}_{MR} + f_M sgn(\dot{\theta}_{MR})] \quad (9)$$

PID control with feed-forward can be realized by adding τFF to the right side of PID control which is feedback control given by Expression (5).

In this manner, in the feed-forward control, not only a target value $\theta_{MR}$ of a rotation angle but also a target value $\theta'_{MR}$ of a rotational angular velocity and a target value $\theta''_{MR}$ of a rotation angle acceleration are used, it is possible to improve followability with respect to a target trajectory.

Figure 8:
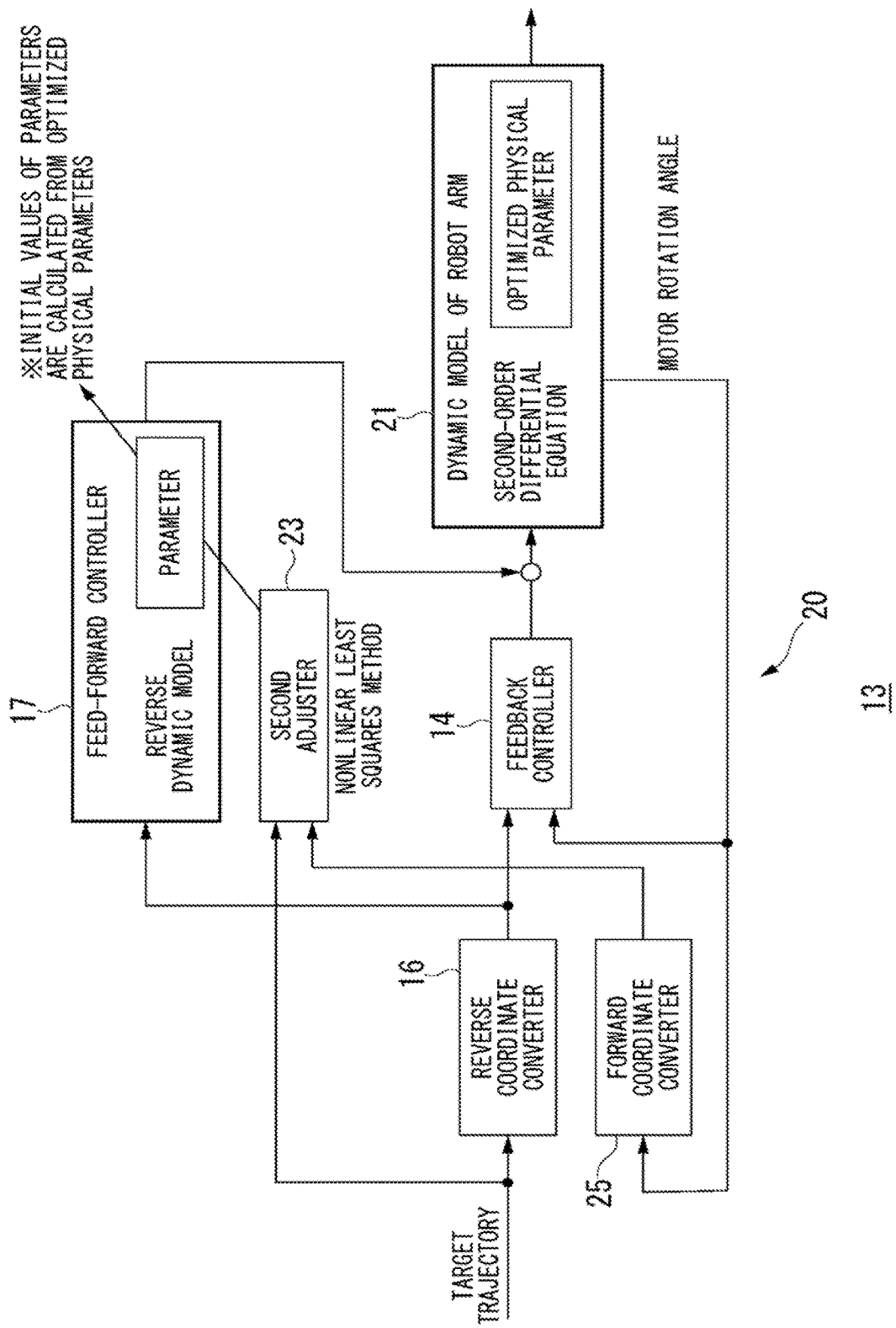
FIG. 8 is a block diagram showing an example of a configuration of a simulator performing optimization of physical parameters of a reverse dynamic model for feed-forward control.

FIG. 8 is a block diagram showing an example of a configuration of the simulator 20 performing optimization of physical parameters of a reverse dynamic model for feed-forward control. A second adjuster 23, the feed-forward controller 17, and a forward coordinate converter 25 are added to the simulator 20 in order to perform optimization of physical parameters of a reverse dynamic model for feed-forward control. The second adjuster 23 performs optimization of physical parameters of a reverse dynamic model as will be described later. The forward coordinate converter 25 performs forward coordinate conversion on a motor rotation angle to calculate coordinate values x and y in a rectangular coordinate system of the tip of the robot arm.

Figure 9:
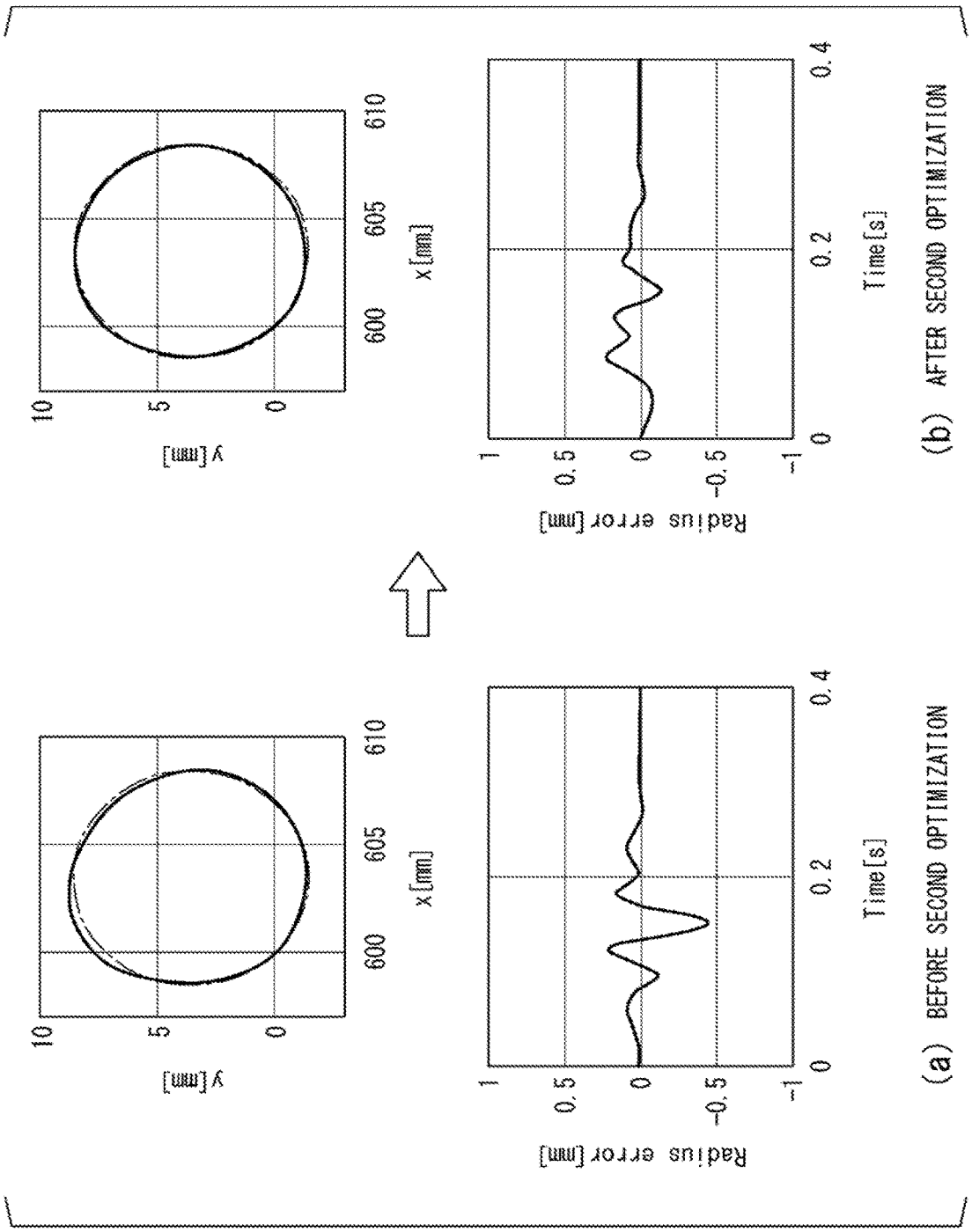
FIG. 9 is a diagram showing an example of operation trajectories before and after second optimization in the circular trajectory shown in FIG. 3($d$).

FIG. 9 is a diagram showing an example of operation trajectories before and after second optimization in the circular trajectory of FIG. 3(d). A solid line in an upper portion of FIG. 9(a) indicates a trajectory of a circular trajectory drawn by the simulator 20 based on a dynamic model in a case where PID control with feed-forward is used. In the simulator 20, the dynamic model 21 using 15 physical parameters having been already optimized is used, and the feed-forward controller 17 using eight parameters calculated from the optimized physical parameters is further added.

As shown in the upper portion of FIG. 9(a), an error from a path of a circular trajectory which is a target value indicated by a dashed line is reduced as compared with FIG. 7, and thus the effect of feed-forward control can be seen. However, an error still remains in a trajectory of an upper left portion of the path of the circular trajectory.

The second adjuster 23 performs optimization of eight physical parameters of a reverse dynamic model for feed-forward control based on a nonlinear least squares method by using coordinate values x and y in a rectangular coordinate system of the tip of the robot arm which are calculated by the forward coordinate converter 25 and coordinate values xR and yR in a rectangular coordinate system of a circular trajectory which is a target value, on the basis of the dynamic model 21 using the 15 physical parameters optimized in FIG. 6. An evaluation function of the optimization is given by the following Expression (10).

$$E_2 = \int [(x_R-x)^2 + (y_R-y)^2] dt \quad (10)$$

Here, a first term on the right side represents the square of an error of a circular trajectory in the X-axis direction, and a second term represents the square of an error of a circular trajectory in the Y-axis direction.

The second adjuster 23 searches for eight physical parameters of a reverse dynamic model on the basis of a nonlinear least squares method by using an evaluation function of a square criterion given by Expression (10). That is, the second adjuster 23 can calculate the eight physical parameters of the reverse dynamic model by performing off-line repetitive learning control and can minimize a control error of the robot arm A.

It can be understood that the trajectory of the circular trajectory of the simulator of PID control with feed-forward in which an error remained on the upper left side in the upper portion of FIG. 9(a) has been greatly improved in the upper portion of FIG. 9(b) through second optimization executed by the second adjuster 23. A lower portion of FIG. 9(a) shows an error of a trajectory of a circular trajectory in a radial direction before the second optimization, and a lower portion of FIG. 9(b) shows an error after the second optimization. It can be understood that a peak value of the error in the latter case is approximately half or less of that in the former case.

Figure 10:
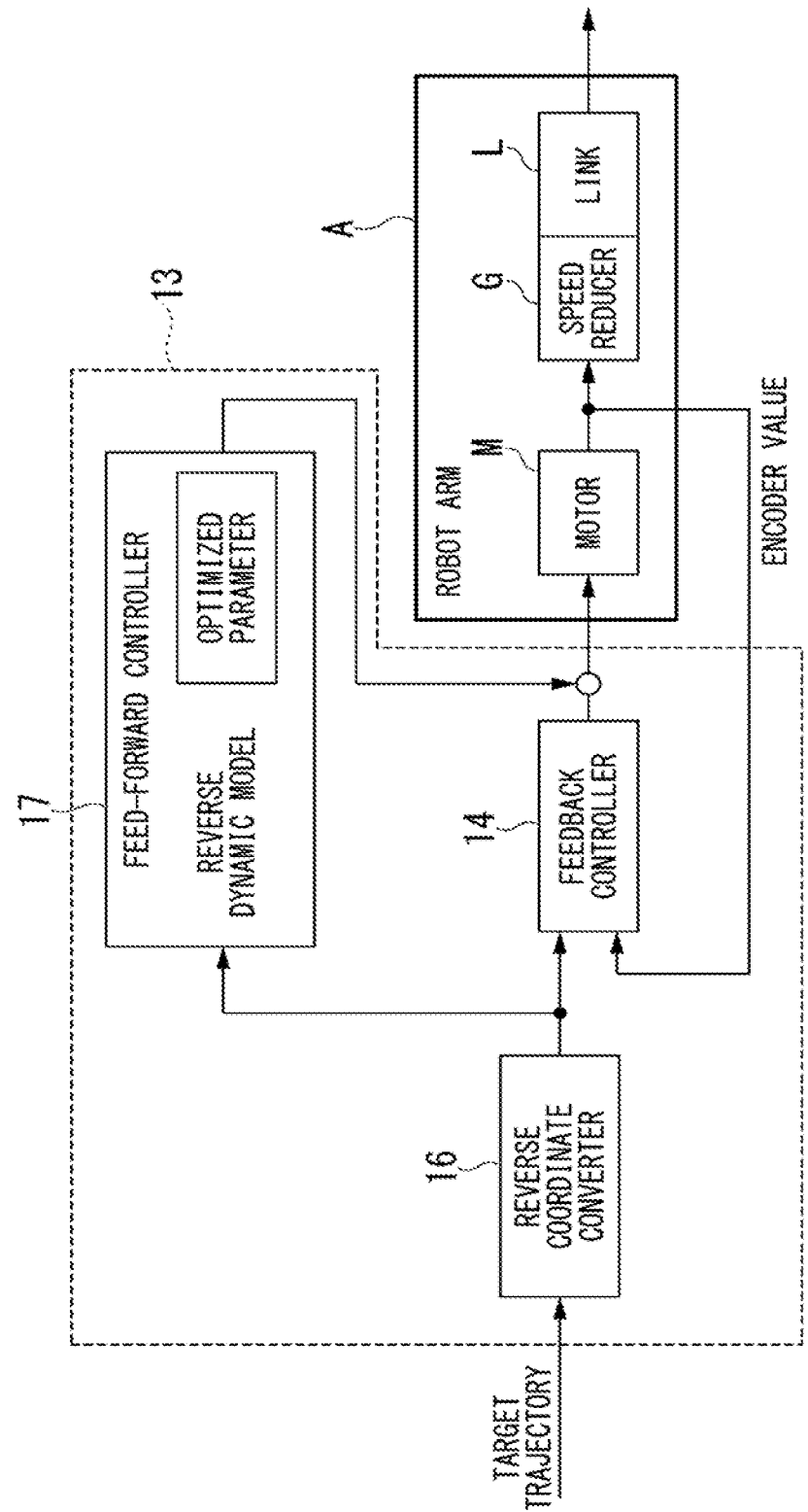
FIG. 10 is a block diagram showing an example of a robot control device in which feedback based on PID control and a feed-forward based on a reverse dynamic model are combined with each other.

FIG. 10 is a block diagram showing an example of the robot control device S in which feedback based on PID control and a feed-forward based on a reverse dynamic model are combined with each other. The feedback controller 14 calculates a control value of the motor M in a path using physical parameters of a dynamic model which are optimized by the first adjuster 22.

Figure 11:
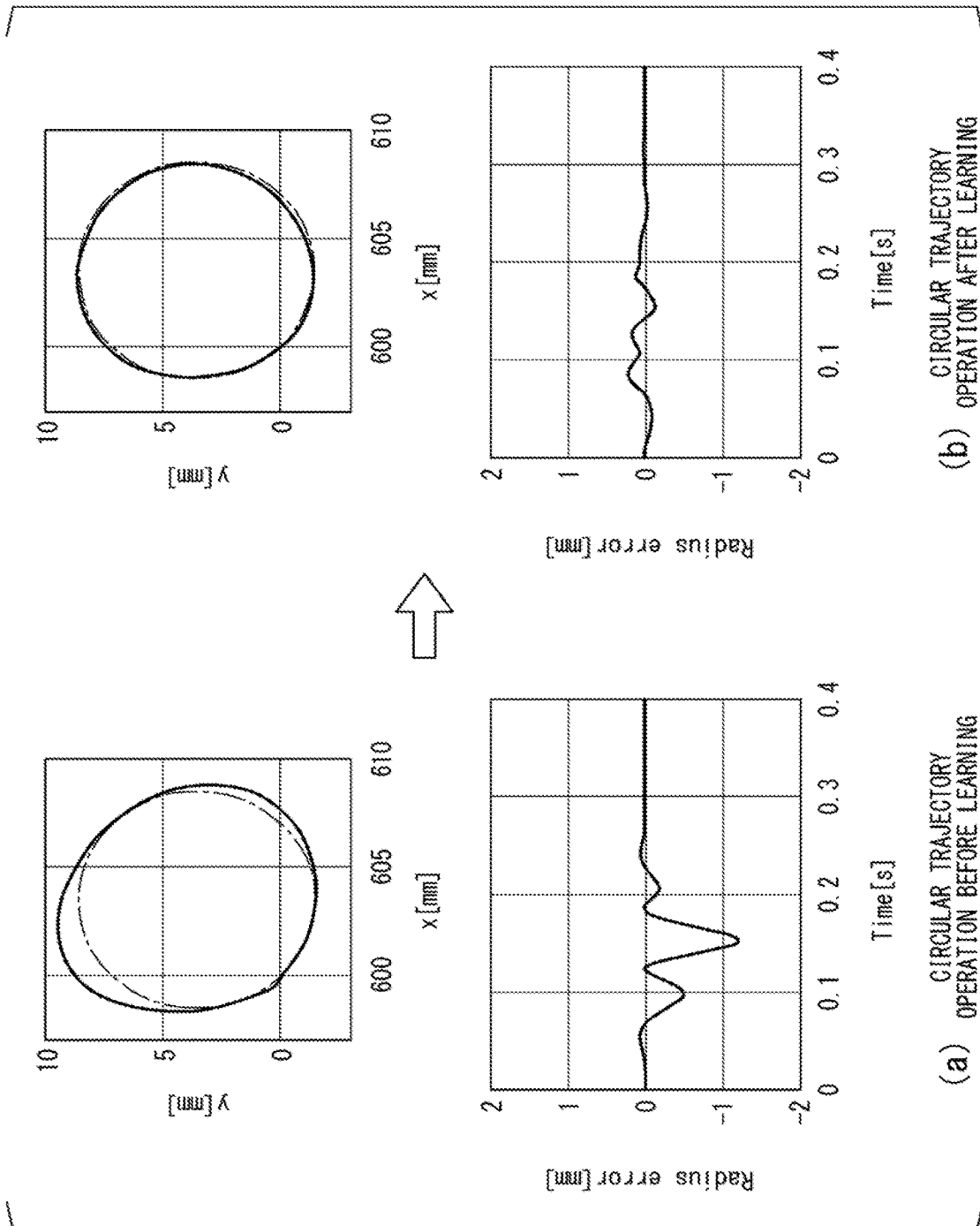
FIG. 11 is a diagram showing an example of results of comparison between the operation of a robot arm before learning and the operation of the robot arm after learning.

FIG. 11 is a diagram showing an example of results of comparison between the operation of the robot arm A before learning and the operation of the robot arm A after learning. FIG. 11(a) shows trajectories (upper portion) and errors (lower portion) in a radial direction in a circular trajectory operation of the real machine of the robot arm A before learning which is controlled only by PID control before first optimization and second optimization.

FIG. 11(b) shows trajectories (upper portion) in a circular trajectory operation and errors (lower portion) in a radial direction of the real machine of the robot arm A after learning to which feed-forward control is added after the first optimization and the second optimization. In the circular trajectory operation of the real machine of the robot arm A after learning, feed-forward control using eight optimized physical parameters is realized.

As described above, the simulator 20 performs two off-line optimizations using a dynamic model by using operation data in a case that the real machine of the robot arm A is operated first so as to draw a circular trajectory. That is, in a case that repetitive learning control is executed through two optimizations using the simulator 20, it is apparent that an error is greatly improved in a second operation of drawing a circular trajectory of the real machine of the robot arm A using the control device 13.

Figure 12:
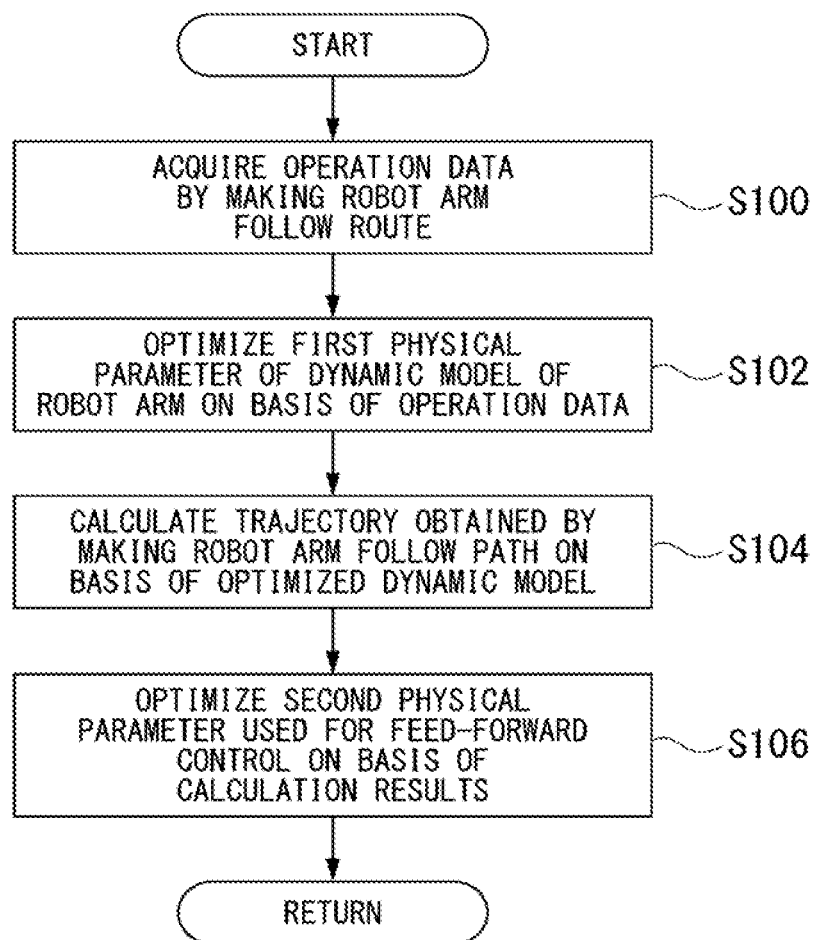
FIG. 12 is a flowchart showing an example of a flow of processing executed in the robot control device.

Next, a flow of processing executed in the robot control device S will be described. FIG. 12 is a flowchart showing an example of a flow of processing executed in the robot control device S.

The log acquisitor 15 acquires operation data in a case that the robot arm A is made to follow a path under portion control (step S100). In this case, the log acquisitor 15 may acquire operation data by monitoring an output value and a control value of an encoder of the motor M or may acquire operation data stored in the storage device 30.

The first adjuster 22 optimizes a first physical parameter included in a dynamic model of the robot arm A so as to minimize a following error between the operation data and a trajectory of the tip of the robot arm A through simulation using the dynamic model (step S102). The first adjuster 22 stores calculation results of the optimized first physical parameter in the storage device 30.

The second adjuster 23 reads out the calculation results of the optimized first physical parameter stored in the storage device 30, and calculates the trajectory obtained by making the tip of the robot arm A follow the path on the basis of the dynamic model of the robot arm A to which the optimized first physical parameter is applied (step S104). In this case, the second adjuster 23 stores the calculation results in the storage device 30.

The second adjuster 23 optimizes a second physical parameter used for feed-forward control on the basis of the calculation results stored in the storage device 30 (step S106). In this case, the second adjuster 23 stores calculation results of the optimized second physical parameter in the storage device 30.

According to the robot control device, the robot control parameter adjustment method, and the program according to the above-described first embodiment, it is possible to reduce a following error in trajectory following control of the tip of the robot arm which is given a path constituted by any figure. According to the robot control device, it is possible to optimize physical parameters for feed-forward control for reducing a following error by acquiring operation data for learning in which the robot arm is operated once.

Second Embodiment

Next, in a second embodiment, a linear trajectory operation in the Y-axis direction shown in FIG. 3(b) will be described. A case where a linear trajectory is drawn by a tip of a 2-link robot arm A for approximately 1.4 seconds with X=600 [mm] and Y=500 [mm] as a starting point and X=600 [mm], Y=−500 [mm] as an ending point will be described.

Figure 13:
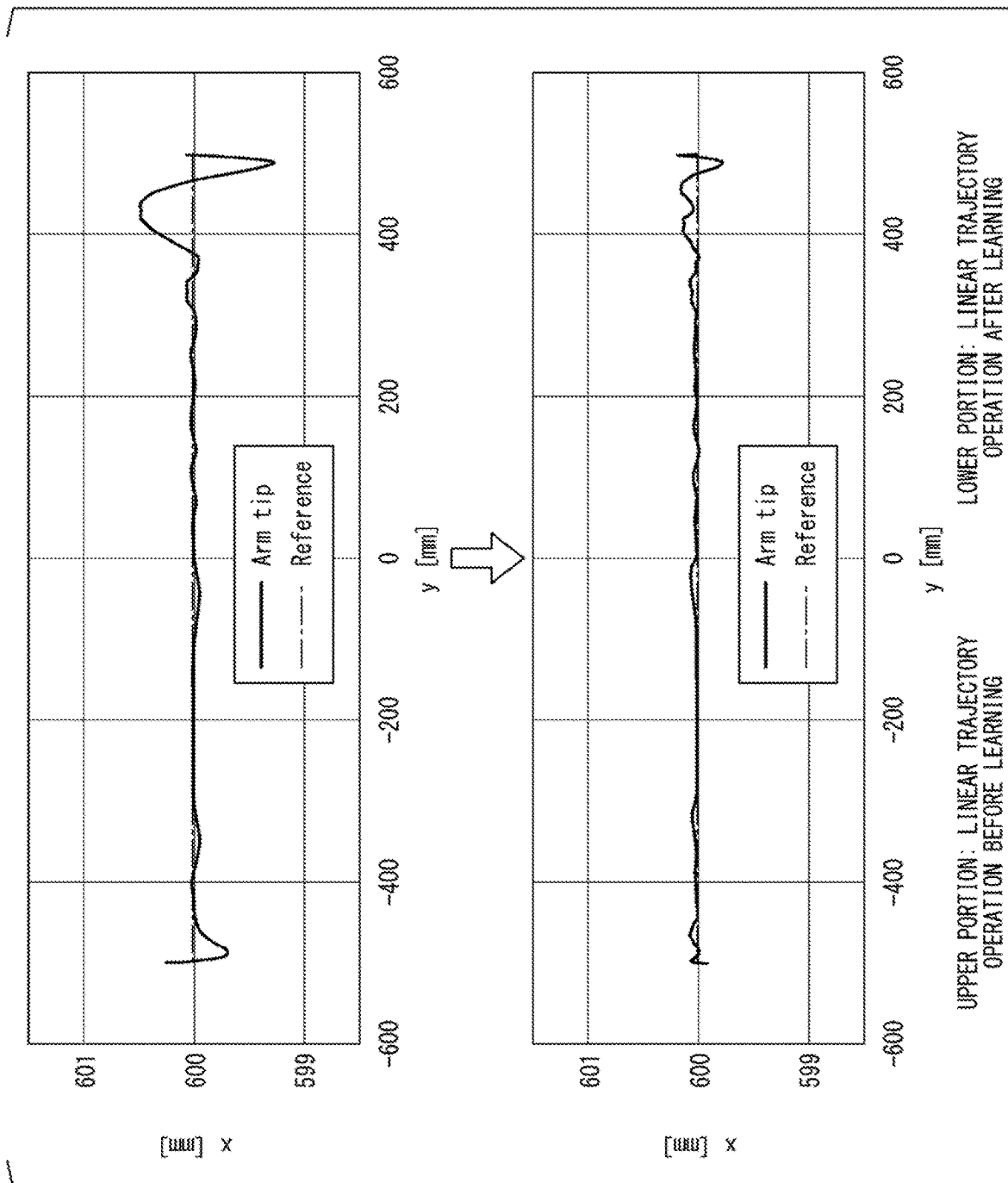
FIG. 13 is a diagram showing an example of results of comparison between the operation of a robot arm before learning and the operation of the robot arm after learning according to a second embodiment.

FIG. 13 is a diagram showing an example of results of comparison between the operation of the robot arm A before learning and the operation of the robot arm A after learning according to the second embodiment. In an upper portion of FIG. 13, a trajectory in a linear operation of the real machine of the robot arm A before learning which is controlled only by PID control before first optimization and second optimization is shown. In a lower portion of FIG. 13, a trajectory in a linear trajectory operation of the real machine of the robot arm A after learning to which feed-forward control is added after the first optimization and the second optimization is shown.

As described above, a simulator 20 performs two off-line optimizations using a dynamic model by using operation data in a case that the real machine of the first robot arm A is operated so as to draw a linear trajectory. That is, in a case that repetitive learning control is executed through two optimizations using the simulator 20, it is possible to greatly reduce a following error in an operation of drawing a linear trajectory of the real machine of the second robot arm A using a control device 13.

In a case that the above-described first embodiment and second embodiment are applied, the same learning effects are obtained by executing the above-described repetitive learning control also in the linear trajectory operation in the X-axis direction shown in FIG. 3(a) and the circular trajectory operation with a diameter of 100 [mm] shown in FIG. 4(c).

Third Embodiment

FIG. 14 is a diagram showing an example of physical parameters obtained from initial identified values through first optimization and second optimization in operations shown in FIGS. 3(a), 3(b), 3(c), and 3(d) according to a third embodiment. In FIG. 14(a), 15 physical parameters obtained through the first optimization are shown. In FIG. 14(b), eight physical parameters for feed-forward which are obtained through the second optimization are shown. In physical parameters for a dynamic model and physical parameters for feed-forward, a moment of inertia and the like are originally invariable, but all of these are fixed to different values in each operation. The reason is because the dynamic model of Expression (1) is just an approximate model and thus fits to each operation data using the degree of freedom of physical parameters in the simulator 20.

In trajectory following control of the robot arm which is given a path constituted by any figure, physical parameters included in a reverse dynamic model of feed-forward are set by dividing any figure into patterned path segments of a straight line or an arc in the simulator 20 and performing the above-described optimization twice for each segment.

In addition, the feed-forward controller 17 executes feed-forward control by switching the physical parameters included in the reverse dynamic model associated with each path segment. Thereby, according to a robot control device S, even in a case that a path set for the robot arm A is constituted by any figure, satisfactory trajectory following characteristics with a reduced following error are obtained in the entire path.

According to the robot control device, the robot control parameter adjustment method, and the program according to the above-described third embodiment, physical parameters can be diverted and operated also in case where only the speed of path following varies because the robot control device, the robot control parameter adjustment method, and the program are based on a dynamic model, unlike a black box model such as a neural network.

The robot control device S according to the above-described embodiment is applied to, for example, calibration of the robot arm A. For example, an operator connects the control device 13 having the simulator 20 installed therein to the robot arm A to operate the robot arm A and performs repetitive learning control on the basis of operation data to optimize the operation of the robot arm A. In addition, the simulator 20 may be configured in a terminal device separate from the control device 13. For example, the robot arm A may be operated by a terminal device having the simulator 20 installed therein, physical parameters may be adjusted on the basis of operation data, and data of the adjusted physical parameters may be output to the control device 13.

In the above-described embodiment, a description has been given on the assumption that the control device 13 is configured as a device separate from the robot arm A, but the control device 13 may be embedded in the robot arm A.

According to at least one embodiment described above, it is possible to reduce a following error in trajectory following control of a tip of a robot arm which is given a path constituted by any figure by including a log acquisitor 15, a first adjuster 22, and a second adjuster 23. The log acquisitor 15 acquires operation data in a case that a target portion of a robot arm A is made to follow a predetermined path under portion control. The first adjuster 22 adjusts a first physical parameter for calculating the operation of the robot arm so as to reduce a following error between a path and the position of the target portion on the basis of the operation data acquired by the log acquisitor 15. The second adjuster 23 calculates a trajectory obtained by making the robot arm follow the path on the basis of the first physical parameter adjusted by the first adjuster and adjusts a second physical parameter used for feed-forward control of the robot arm on the basis of calculation results.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A robot control device, comprising:
   circuitry configured to
      acquire operation data of an actual trajectory of a robot arm, which has been operated by making a target portion of the robot arm follow a predefined target path under a feedback control;
      calculate a trajectory when making the target portion follow the predefined target path in a case of performing a first simulation using a first physical parameter in the feedback control, adjust the first physical parameter so as to reduce an error between the trajectory and the actual trajectory based on the acquired operation data, and reduce a following error between the predefined target path and positions of the target portion; and calculate an initial identified value of a second physical parameter to be used for a feed-forward control, adding in the feedback control using the adjusted first physical parameter, and repeatedly perform a second simulation of the feedback control adding the feed-forward control, and adjust the second physical parameter using the adjusted first physical parameter and the initial identified value of the second physical parameter.

2. The robot control device according to claim 1, wherein the circuitry is further configured to optimize the first physical parameter included in a dynamic model for calculating an operation of the robot arm so as to minimize the error between the predefined target path and the positions of the target portion, based on the acquired operation data.

3. The robot control device according to claim 1, wherein the circuitry is further configured to calculate the trajectory of the target portion based on the adjusted first physical parameter and to optimize the second physical parameter to be used for the feed-forward control of the robot arm, based on results of the calculation and a reverse dynamic model.

4. The robot control device according to claim 1, wherein the circuitry is further configured to
optimize the first physical parameter included in a dynamic model for calculating an operation of the robot arm for each segment of the predefined target path represented by basic figure patterns, and
optimize the second physical parameter used for the feed-forward control for each segment.

5. The robot control device according to claim 4, wherein the circuitry is further configured to:
execute feed-forward control by switching the second physical parameter used for the feed-forward control for each segment of the predefined target path.

6. A robot control device according to claim 1, wherein the circuitry is further configured to:
execute feed-forward control by switching the second physical parameter used for the feed-forward control for each segment of the predefined target path represented by basic figure patterns.

7. A robot device comprising:
a robot arm that includes a plurality of arms having a plurality of movable axes, and
the robot control device according to claim 1.

8. A computer-implemented method for a robot control parameter adjustment, the method comprising:
acquiring operation data of an actual trajectory of a robot arm, which has been operated by making a target portion of the robot arm follow a predefined target path under a feedback control;
calculating a trajectory when making the target portion follow the predefined target path in a case of performing a first simulation using a first physical parameter in the feedback control;
adjusting the first physical parameter so as to reduce an error between the trajectory and the actual trajectory based on the acquired operation data, and reduce a following error between the predefined target path and positions of the target portion;
calculating an initial identified value of a second physical parameter to be used for a feed-forward control, adding in the feedback control using the adjusted first physical parameter; and
repeatedly performing a second simulation of the feedback control adding the feed-forward control, and adjusting the second physical parameter using the adjusted first physical parameter and the initial identified value of the second physical parameter.

9. The computer-implemented method according to claim 8, further comprising:
acquiring, from a storage, operation data of the robot arm, which has been operated by making the target portion of the robot arm follow the predefined target path under the feedback control;
storing a first calculation result in the storage, the first calculation result including the first physical parameter which has been adjusted, based on the acquired operation data, for calculating the trajectory of the target portion, to reduce errors between the predefined target path and positions of the target portion;
storing a second calculation result in the storage, the second calculation result including the trajectory of the target portion which has been calculated, based on the adjusted first physical parameter; and
storing a third calculation result in the storage, the third calculation result including the second physical parameter which has been adjusted, based on the calculated trajectory, for the feed-forward control for controlling the robot arm.

10. A non-transitory computer readable storage medium that stores a computer executable program, when executed by a computer, to cause the computer to perform a computer-implemented method for a robot control parameter adjustment, the method comprising:
acquiring operation data of an actual trajectory of a robot arm, which has been operated by making a target portion of the robot arm follow a predefined target path under a feedback control;
calculating a trajectory when making the target portion follow the predefined target path in a case of performing a first simulation using a first physical parameter in the feedback control;
adjusting the first physical parameter so as to reduce an error between the trajectory and the actual trajectory based on the acquired operation data, and reduce a following error between the predefined target path and positions of the target portion;
calculating an initial identified value of a second physical parameter to be used for a feed-forward control, adding in the feedback control using the adjusted first physical parameter; and
repeatedly performing a second simulation of the feedback control adding the feed-forward control, and adjusting the second physical parameter using the adjusted first physical parameter and the initial identified value of the second physical parameter.

* * * * *